United States Patent [19]

Crossland et al.

[11] 4,419,664
[45] Dec. 6, 1983

[54] CO-ORDINATE ADDRESSING OF SMECTIC DISPLAY CELLS

[75] Inventors: William A. Crossland, Harlow; David Coates; Peter J. Ayliffe, both of Bishop's Stortford, all of England

[73] Assignee: International Standard Electric Corporation, New York, N.Y.

[21] Appl. No.: 219,559

[22] Filed: Dec. 23, 1980

[30] Foreign Application Priority Data

Jan. 16, 1980 [GB] United Kingdom ................. 8001499

[51] Int. Cl.³ ............................................... G09G 3/36
[52] U.S. Cl. ................... 340/784; 350/350 S
[58] Field of Search .............. 340/784, 765, 805; 350/333, 350 S, 330

[56] References Cited

U.S. PATENT DOCUMENTS

| | | | |
|---|---|---|---|
| 3,575,492 | 4/1971 | Nester | 350/333 |
| 4,139,273 | 2/1979 | Crossland et al. | 350/350 S |
| 4,196,974 | 4/1980 | Hareng et al. | 350/350 S |

OTHER PUBLICATIONS

*Electric Field Effects on Biphenyl Smectic A Liquid Crystals*; Hareng et al; Appl. Phys. Lett.; vol. 25, #12; 12/74, pp. 683–685.

Primary Examiner—Marshall M. Curtis
Attorney, Agent, or Firm—John T. O'Halloran; David M. Quinlan

[57] ABSTRACT

A co-ordinate matrix addressing system is used to address a liquid crystal display cell containing a positive dielectric anisotropy smectic material. For this purpose one or more direct voltage pulses are applied across selected elemental volumes of the display to convert them from a focal-conic scattering state to a homeotropically aligned state. Prior to this all elements are electrically driven into the turbulent scattering state which relaxes into the focal-conic scattering state upon removal of the driving field. The driving field may also take the form of direct voltage pulses.

14 Claims, 2 Drawing Figures

CO-ORDINATE ADDRESSING OF SMECTIC DISPLAY CELLS

FIELD OF THE INVENTION

This invention relates to the co-ordinate addressing of smectic liquid crystal display cells.

SUMMARY OF THE INVENTION

According to the invention there is provided a method of co-ordinate matrix addressing an internally electroded liquid crystal display cell which has a layer of smectic material sandwiched between two electroded plates which have a first array of electrodes on one of the plates crossing over a second array on the other plate defining therebetween a set of elemental volumes of liquid crystal each element of which is defined by the thickness of the liquid crystal layer and the area of overlap where a member of the first array crosses over a member of the second, wherein the smectic material exhibits positive dielectric anisotropy and has an electrical conductivity large enough for dynamic scattering to be capable of being produced by the application of an electric field across the layer, and wherein at least one of the plates is transparent and its surface in contact with the liquid crystal layer is such that, when the layer is taken into a smectic phase from less-ordered non-smectic phase by cooling in the absence of an applied field, those molecules of the layer adjacent said surface are caused to assume substantially homeostatic alignment, which method includes the step of applying an electric potential between the members of the first array and those of the second in such a way as to cause dynamic scattering in said set of elemental volumes, of converting the dynamic scattering in the set of elemental volumes into static focal-conic scattering by removal of said potential, and of selectively restoring individual elemental volumes to non-scattering substantially homeotropically aligned state, each of which is restored by the application of not more than ten direct voltage switching pulses between the two electrodes defining that elemental volume.

BRIEF DESCRIPTION OF THE DRAWINGS

The addressing of a smectic liquid crystal display cell according to methods embodying the invention in preferred forms will now be described, but this description will be prefaced with an explanation of the background to the invention. The description and explanation make reference to the accompanying drawings in which.

BACKGROUND AND DETAILED DESCRIPTION OF THE INVENTION

Figure 1:
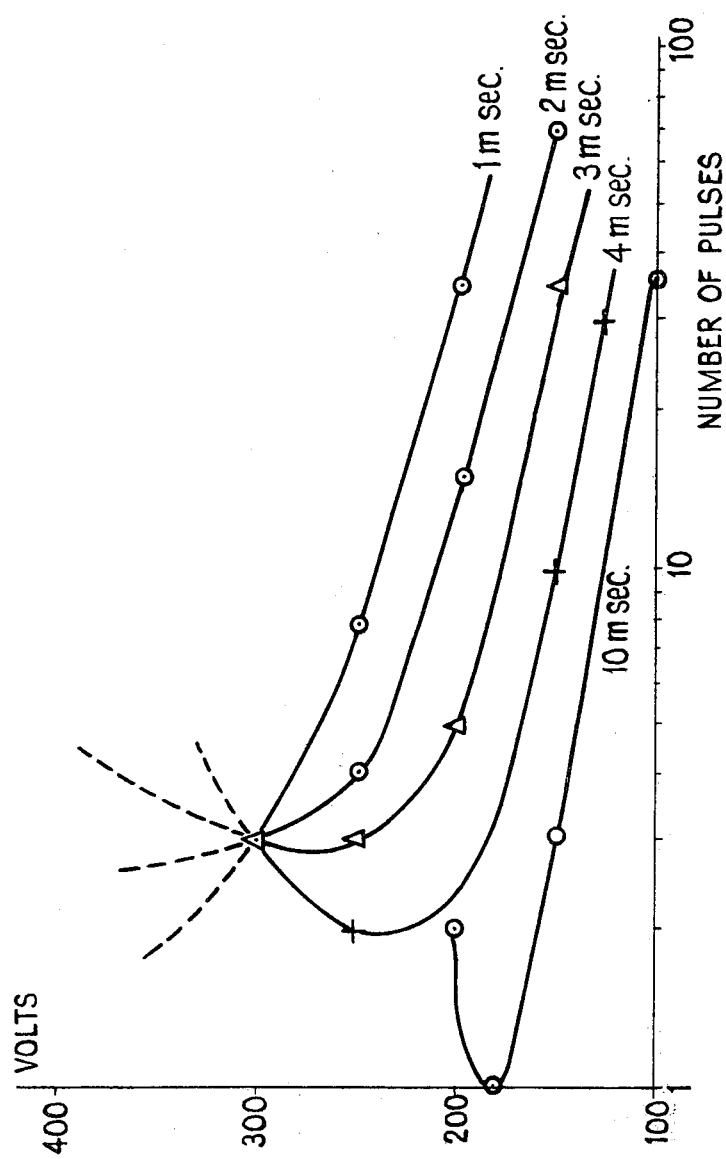
FIG. 1 is a graph showing how the number of pulses required to effect erasure depends upon pulse voltage and duration.

United Kingdom Patent Specification No. 1 557 199, and an article by D. Coates—W. A. Crossland—J. H. Morrissy and B. Needham entitled "Electrically induced scattering textures in smectic A phases and their electrical reversal" appearing in the Journal of Physics D: Applied Physics, Volume 11 pages 2025-34, both describe the reversible switching of a smectic liquid crystal display cell between a clear state and a scattering state by the application of alternating electric potentials across the electrodes of such a cell. In the case of a 20 micron thick layer of 4-cyano-4'-n-octylbiphenyl (8 CB) it was found that r.m.s. voltages in the region of 200 volts at 50 Hz gave a writing time (converting the alignment from homeotropic to dynamic scattering) in the region of 80 m sec. If the voltage was halved, the writing time increased to about 450 msec. Correspondingly, an r.m.s. voltage of 100 volts at 1 kHz gave an erase time in the region of 90 msec. If the voltage was halved, the erase time was increased to about 3.2 seconds. Since relatively large switching voltages and long switching times are both to be deprecated, an attempt has been made to improve the voltage and/or time requirements involved in refreshing a co-ordinate display of this type.

The mechanism of writing and erasure of these cells involves two separate electro-optic effects. Erasure is brought about by a dielectric alignment of the smectic molecules, which have positive dielectric anisotropy. This should be most efficient when the inverse of the alternating frequency is much shorter than the space-charge relaxation time which is necessary if the material is to reach electrostatic equilibrium after applying an electric field. In nematics this frequency is of the order of 1 kHz or greater, and the situation appears to be similar to smectics. At lower frequencies some electrohydrodynamic instabilities are liable to occur which result in less than perfect homeotropic alignment. (It appears however that small deviations from perfect homeotropic alignment are to be welcomed because they provide nucleation sites facilitating the initiation of turbulent scattering. In the case of a display cell having a 20 micron thick layer of 8 CB erasure can be effected with a frequency of 1 kHz at 65 volts r.m.s. to provide homeotropic alignment in which the deviations are small enough to result in no visible effect on the clarity of the homeotropically aligned cell.

The application of lower frequencies results in the major electrohydrodynamic instability referred to as the turbulent scattering state. In nematic materials dynamic scattering usually involves a conductivity torque acting on the molecules in order to align them along the direction of ionic movement. This direction is orthogonal to that in which purely dielectric forces are attempting to align them. The vortices are formed in planes that lie along the applied electric field direction. However examination of turbulent scattering in smectic materials reveals that in these materials the vortices are formed in a plane that is orthogonal to the applied field direction. Conduction forces resulting from ions moving along the field direction are attempting to align the molecules in the same direction as the dielectric forces, however the layered structure of the smectic A state opposes such movement of ions. It is believed that it is this opposition that gives rise to the turbulence, though it is not understood why this should result in vortices orthogonal to the direction of the applied field. Deviations from a perfect homeotropically aligned layered smectic A structure appear to play an important part in the initiations of a turbulent scattering state. This may be because undulation in the smectic layers allow ions to move between the layers under the influence of the applied field to the point where disruption to the layers can occur. Alternatively undulations forced on the layer by surface roughness, or by electrohydrodynamic instabilities present during erasure, may result in weak points where ions can penetrate the layers. Whatever the reason, it is found that the presence of deviations facilitates the initiation of turbulent scattering by lowering the threshold voltage and/or speeding up the response time. Thus in the case of a display cell with smooth inner walls it has been found that the improvement in quality of the homeotropically aligned layers provided by raising the erasure frequency from about 1 kHz to over 2 kHz makes subsequent re-writing very slow. It is also expected that the use of a smectic C material will provide deviations tending to provide a low threshold and/or fast response time.

Figure 2:
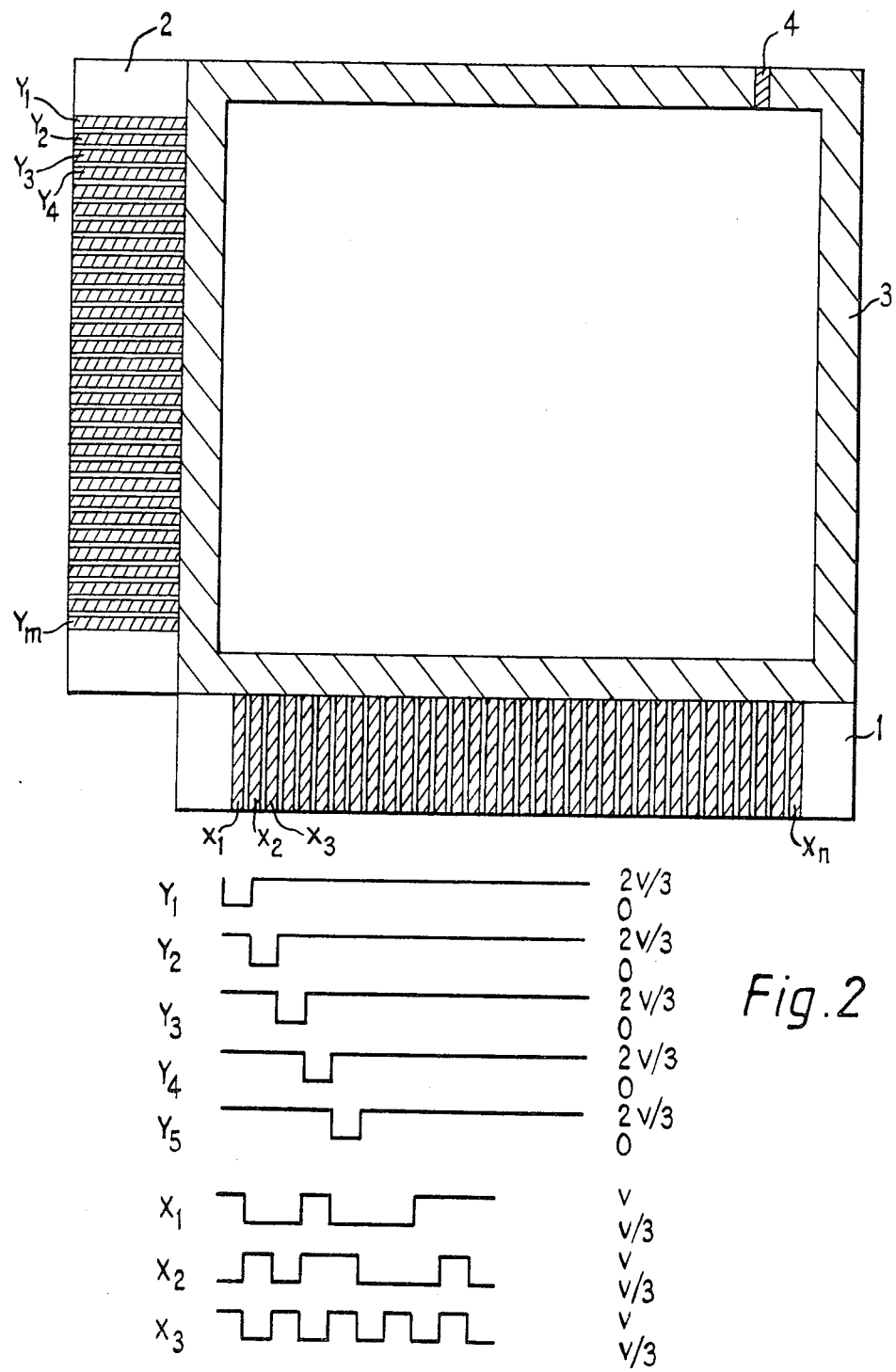
FIG. 2 depicts a display cell and examples of pulse waveforms applied to certain of its electrodes in order to effect selective erasure.

FIG. 2 of the above mentioned patent specification and FIG. 5 of the corresponding above mentioned article show how the erasing threshold voltage varies with frequency, decreasing with increasing frequency above about 400 Hz. This suggests that it would be advantageous to erase with high frequencies well above 400 Hz, but having regard to the requirement not to use such a high frequency that subsequent re-writing is not rendered unduly slow. The higher threshold voltage disadvantage of working at low frequencies in the region of 400 Hz or lower is also associated with the disadvantage that operation is approaching closer to the region used for writing the cell rather than erasing it. However it has now been found possible to use direct voltage pulses to effect erasure instead of using an alternating voltage.

In order to investigate erasure of a focalconic scattering state by direct voltage pulses, a cell was constructured having a 20 micron thick layer of 8 CB. When using 10 msec pulses it was found that with 100 volt pulses approximately 125 pulses were needed to effect complete erasure. When the height of the pulses was raised to 150 volts, the number of pulses required for full erasure was reduced to 3. At 200 volts only 2 pulses were required, while at an intermediate voltage of about 180 volts only one pulse was required. In general a similar sort of effect was observed with pulses of shorter duration, with narrower pulses requiring higher pulse voltages to erase the cell with the same number of pulses. Some results are set out in graphical form in FIG. 1. These results were derived using a pulse repetition frequency of 1 Hz, but the effect does not appear to be sensitive to the interval between pulses. The turnover exhibited by the wider pulses in which increasing voltage, after first reducing the number of pulses required, then begins to increase it is believed to be caused by the fact that at these larger voltages the pulses begin to resemble pulses that can be used for writing, that is pulses that can be used to send the cell into the focal conic scattering state via the turbulent scattering state. All these effects exhibit temperature dependence.

FIG. 1 thus shows that if the pulse width is shortened below 10 msec it becomes necessary to increase the voltage to enable the erasure to be effected with a single pulse. This means that the voltage starts to approach the threshold for inducing scattering. The result of this is that, for this cell, in the case of pulse widths in the range 10 msec to 3 msec there is an optimum voltage for each pulse width at which the number of pulses required to give complete erasure is a minimum. For this cell the minimum number of pulses is not unity for pulse widths of more than 1 msec and less than 10 msec. Thus the minimum number is 2 for 4 msec pulses and is 3 for both 2 msec pulses and 3 msec pulses. As the pulse width becomes still shorter it becomes comparable with or smaller than the space-charge relaxation time in the liquid crystal. Under these conditions the scattering threshold voltage increases fairly rapidly, with the result that, although higher voltages are required for erasure, the minimum number of pulses required to effect this erasure begins to fall again. A 1 msec pulse causes almost complete erasure of 400 volts.

In a co-ordinate matrix addressing scheme there are two facts which limit the voltages used in the selective drive. One is that the chosen voltage should be low in order to simplify the provision of the drive voltage and its selection. The other is the need to ensure that voltages appearing at non-selected elements in the matrix do not produce any deleterious effects. The nature of this latter limitation will depend upon the particular matrix addressing scheme employed.

One form of matrix addressing scheme, known as 'one third select' will now be described with reference to FIG. 2. Two glass sheets 1, and 2 to form a display cell are secured together by a perimeter seal 3 to form an envelope for a layer of a smectic liquid crystal filling to be hermetically sealed within the cell. In this particular instance the perimeter seal provides a layer thickness of 20 microns for the liquid crystal filling. This filling is the smectic material 8 CB and is introduced into the cell via an aperture formed by an interruption in the perimeter seal 3. After the cell has been filled this aperture is sealed off with a plug 4, for instance of indium. Alternatively solder is used for the plug, in which case the walls of the aperture are metallized prior to the filling of the cell.

Before they are secured together the inwardly facing surfaces of the two sheets are provided with transparent electrodes of appropriate layout for the required display. In this instance a cartesian co-ordinate array is required, and hence sheet 1 carries a set of column electrodes $x_1, x_2 \ldots x_n$, while sheet 2 carries a set of row electrodes $y_1, y_2, \ldots y_m$. These electrodes extend beyond the region of the perimeter seal in order to permit external connection. For the sake of clarity, detail of the layout of the electrodes within the cell has been omitted, though in the regions beyond the cell their layout has been represented, and in these regions they may be individually provided with a non-transparent electrically conductive coating to provide a more robust contact with which to make electrical connection. Within the area defined by the perimeter seal the electrodes are covered with an electrically insulating film of silica deposited by reacting silane with oxygen at atmospheric pressure in order to prevent continuous direct current flow. Direct current excitation of nematic and cholesteric liquid crystal cells is generally to be deprecated because it usually results in a short life due to electrolytic degradation. However in a smectic cell exhibiting storage this factor assumes a lessened importance because the display does not require continuous excitation. Nevertheless it is generally prudent to arrange the switching in such a way as to minimize the risk of electrolytic degradation.

In a cell designed to have a speclar reflector behind the liquid crystal layer a specularly reflective non-transparent electrode array may, on the rear sheet, be used in place of the transparent electrode array in order to provide the dual function of electrode array and reflector. Such an array may be for instance made of aluminum or chromium.

The inwardly facing surface of at least one, and preferably both, of the sheets 1 and 2 are provided with a coating or other surface treatment that will cause the liquid crystal molecules adjacent the treated surface to assume substantially homeotropic alignment when the liquid is taken by cooling into a smectic phase in the absence of any electric field applied across the thickness of the layer.

A preferred surface treatment is that provided by coating the glass surfaces with lecithin or headecyltrimethyl ammonium bromide (HMAB) solutions. If a fused glass frit perimeter seal is used for the cell as is generally preferred on account of its inertness, this surface treatment is applied after the firing of the frit. The treatment is effected by first filling the assembled cell with the required solution and then draining it. Then the cell is filled with the requisite liquid crystal medium, in this instance 8 CB. By using a 0.2% solution of HMAB solution for alignment it has been found that residual traces of the HMAB remaining in the cell serve to dope the subsequent liquid crystal filling bringing up its conductivity to about $10^8$ ohm cm which is a suitable value for dynamic scattering.

In the 'one third select' mode of addressing all the y electrodes are held at a first voltage level except while they are being strobed in turn with a second voltage level. The difference between these voltage levels is the strobing voltage designated $V_S$. The x electrodes are used for the input of data and are individually and selectively switched between third and fourth voltage levels respectively at $V_D$ above and $V_D$ beneath the first voltage level. This arrangement of voltage levels is such that, when a row electrode $y_b$ is being strobed, the voltage appearing across the elemental volume of liquid crystal $x_ay_b$, defined by the region where the column electrode $x_a$ crosses row electrode $y_b$, is either $(V_S+V_D)=V_E$, the voltage sufficient to switch (erase) that volume, or the smaller voltage $(V_S-V_D)$ depending upon whether column electrode $x_a$ is held at the third or the fourth level during the strobing pulse. In the one third select mode of addressing $V_S$ is made equal to twice $V_D$. Under these circumstances it is seen that the magnitude of the voltage applied across the elemental volume is either $3V_D=V_E$ or $V_D$ during a strobing pulse, and is equal to $V_D$ at other times. Thus the input of data is determined by the potentials appearing on the column electrodes while the row electrodes are being strobed. When any row electrode other than $y_b$ is being strobed, the magnitude of the voltage appearing across the elemental volume $x_ay_b$ is only $V_D$, and hence it can only be switched during the strobing interval associated with its own row.

With the particular waveforms illustrated in FIG. 2 the elemental volumes $x_1y_1$ and $x_3y_1$ are selected in the first strobing interval while that of $x_2y_1$ is left unselected. In the second strobing interval $x_2y_2$ is selected, but $x_1y_2$ and $x_3y_2$ are not. In the third strobing interval $x_3y_3$ is selected but $x_1y_3$ and $x_2y_3$ are not. An unselected elemental volume such as $x_1y_5$ never sees a full voltage pulse $V=3V_D$, but during the strobing operation it sees a number of pulses whose modulus is $V/3=V_D$. If V is less than three times the switching threshold for a semi-infinite train of pulses it is evident that there is no restriction upon the number n of column electrodes that can be addressed. In other circumstances the train of $V/3$ pulses is liable to produce a cumulative effect gradually changing the appearance of an unselected elemental volume until it resembles that of selected elements. To avoid confusion the number of pulses in a pulse train must be limited, and hence a limit is imposed upon the number n of column electrodes that can be addressed in this manner.

Taking account of these factors, a cell has been constructed and operated in which 40 column electrodes were strobed with 10 msec pulses using a switching voltage $V_E$ of 180 volts. The writing of the entire cell, prior to selective erasure, was effected using a 50 msec pulse of 300 volts applied simultaneously across all the elements. This gives a 'page refresh' time for the display of less than half a second.

FIG. 1 shows that the same 'page refresh' time can in principle alternatively be achieved using five 2 msec pulses to achieve full erasure of each element. Under these circumstances the selected points are not fully erased until the completion of the fifth scan. The penalty of this arrangement is that the erasure switching voltage $V_E$ has to be increased to the region of 250 volts. On the other hand a greyscale becomes possible to achieve by applying a switching pulse to a given element on one or more of the five scans, but not on others. In order to reduce the effects of net voltage bias in one direction, it is possible to reverse the polarity of the pulses for each alternate scan. This procedure is capable of eliminating net voltage bias in the case of full erasure using an even number of scans. The application of bipolar pulses (a pulse of one polarity followed by an equivalent pulse of the opposite polarity) across the cell may be used as an alternative to reversing the polarity of pulses for each alternate scan, and furthermore bipolar pulsing can also be used to eliminate net voltage bias in the writing of the entire cell.

It has been stated above that the use of a voltage $V_E$ equal to or greater than three times the switching threshold for a semi-infinite train of pulses sets a limit to the number n of column electrodes that can be addressed. In the case of the above described cell the specific filling construction and operations appears to set this limit to a value in the region of n=40. However it has been observed that the pulse required to cause dynamic scattering in an elemental volume depends on the texture of the smectic liquid crystal at that point, the more disrupted the texture, the easier it is to initiate dynamic scattering. For this reason a pulsed voltage can be applied to an array of elemental volumes, some of which have already been erased and others not, such that the voltage pulse will initiate dynamic scattering in volumes that are already scattering (in the storage state), but will have a much smaller effect on erased volumes. An alternative drive scheme can therefore be used in which lines are addressed sequentially until unselected elements just start to be erased, and then a second single blanking pulse is applied to the whole display, with a waveform such that it rescatters all the unselected elemental volumes while having negligible effect on the selected (and therefore erased) volumes. The application of this one intermediate blanking pulse, which of short duration doubles the number of lines that can be addressed. In principle this process can be repeated several times.

Experiments with the present display cells have shown that it is preferable to use an intermediate blanking pulse which is of the same voltage as $V_B$ but of shorter duration. A pulse of 300 V and 10 ms duration (compared with 50 ms for the initial page blanking) will cause dynamic scattering of the elemental volumes in the storage state, while producing only a small effect on previously erased volumes. The 10 ms time slot required for this intermediate blanking is not a significant addition to the total page-write time, since it is only required once to double the number of lines addressed.

The number of lines that can be addressed can also be increased by moving away from the one third select addressing mode. In that addressing mode $V_S$ is made equal to twice $V_D$, with the result that an unselected elemental volume sees in its associated strobing interval a pulse the magnitude of whose voltage is equal to that of pulses it sees during the other strobing intervals. It is found however that if $V_S$ is increased by a certain amount and $V_D$ is reduced by a corresponding amount (so as to retain a constant value for the switching voltage $V_E$) the increased response of an unselected elemental volume evoked by the larger pulse received during its associated strobing interval is more than offset by the smaller responses evoked by the smaller pulses received during the other strobing intervals. This is demonstrated for instance when $V_S$ and $V_D$ are changed such that $V_S=3V_D$. Under these circumstances an unselected elemental volume in a display of n columns receives one pulse of magnitude $V_E/2$ and (n−1) pulses of magnitude $V_E/4$.

To investigate the effect of changing the relative pulse heights all the elemental volumes of a display cell were first set into a scattering state using a 50 msec 300 volt writing pulses, and then addressed simultaneously with a train of 80 10-msec 60-volt pulses to simulate non-selected elemental volumes in a one third select addressing mode for a 40 line display requiring two 180 volt pulses for full erasure. After a pulse train of this length the scattering state of the elemental volumes appeared not substantially degraded, whereas using a train of 160 10-msec 60 volt pulses produced a patchy appearance. However when the addressing pulses were changed to simulate the $V_S=3V_D$ mode by using a single 10-msec 90 volt pulse followed by 119 10-msec 45 volt pulses, followed by a further 10 msec 90-volt pulse which was followed by a further 119 10-msec 45-volt pulses, it was found that the scattering state was not substantially degraded. (The apparatus used for performing this simulation required manual adjustment of the pulse height and so it was not possible to perform the entire pulse sequence without interruption. In these circumstances the interval between pulses of different amplitudes was standardized at 30 seconds). It thus appears that the transition from $V_S=2V_D$ to $V_S=3V_D$ produces an improvement allowing something in the neighborhood of a threefold increase in the number of lines that can be addressed.

Although the invention has been described by referring to specific embodiments, those skilled in the art will recognize modifications that can be made to the embodiments described herein that fall within the spirit of the present invention. Therefore, the foregoing description does not limit the scope of the present invention, which is to be determined by the appended claims.

What is claimed is:

1. A method of co-ordinate matrix addressing in internally electroded liquid crystal display cell which has a layer of smectic material sandwiched between two electroded plates crossing over a second array on the other plate defining therebetween a set of elemental volumes of liquid crystal each element of which is defined by the thickness of the liquid crystal layer and the area of overlap where a member of the first array crosses over a member of the second, wherein the smectic material exhibits positive dielectric anisotropy and has an electrical conductivity large enough for dynamic scattering to be capable of being produced by the application of an electric field across the layer, and wherein at least one of the plates is transparent and its surface in contact with the liquid crystal layer is such that, when the layer is taken into a smectic phase from less-ordered non-smectic phase by cooling in the absence of an applied field, those molecules of the layer adjacent said surface are caused to assume substantially homeotropic alignment, which method includes the steps of applying an electric potential between the members of the first array and those of the second in such a way as to cause dynamic scattering in said set of elemental volumes, converting the dynamic scattering in the set of elemental volumes into static focal-conic scattering by removal of said potential, and selectively restoring individual elemental volumes to non-scattering substantially homeotropically aligned state by the concurrent application of direct voltage signals of predetermined durations and magnitudes to selected electrodes in said arrays such that not more than ten direct voltage resultant switching pulses are applied between the two electrodes defining any elemental volume.

2. A method as claimed in claim 1 wherein each said selective restoration of an individual elemental volume to a non-scattering state is effected using a plurality of switching pulses providing a potential difference across the elemental volume that is not in the same direction for all of said switching pulses.

3. A method as claimed in claim 2 wherein said plurality of switching pulses is such as to alternate the direction of the potential difference.

4. A method as claimed in claim 2 wherein after a switching pulse is applied to a selected elemental volume the scan is completed before the next switching pulse is applied to that elemental volume.

5. A method as claimed in claim 3 wherein in any scan of the matrix switching pulses are applied in pairs to the selected elemental volumes such that each is subjected to a bipolar pulse potential difference waveform.

6. A method as claimed in claim 2, 3, 4 or 5 wherein a grey-scale is provided by applying fewer switching pulses to some of the selected elemental volumes than are applied to others.

7. A method as claimed in claim 1, 2, 3, 4 or 5 wherein the step of selectively restoring individual elemental volumes to a non-scattering state is effected by holding all the members of the first array of electrodes at a particular first direct voltage level except while they are being strobed in turn with a second direct voltage level $V_S$ from the first level, while at the same time the members of the second array are individually and selectively switched between third and fourth direct voltage levels respectively $+V_D$ and $-V_D$ from the first voltage level, and wherein $V_S \geq 2V_D$.

8. A method as claimed in claim 7 wherein $V_S<3\ V_D$.

9. A method as claimed in claim 7 wherein $V_S=2\ V_D$.

10. A method as claimed in claim 7 wherein $V_S=3\ V_D$.

11. A method as claimed in claim 1, 2, 3, 4 or 5 wherein the electric potential applied between the members of the first array of electrodes and those of the second to cause dynamic scattering takes the form of a single direct voltage pulse.

12. A method as claimed in claim 1, 2, 3, 4 or 5 wherein the electric potential applied between the members of the first array of electrodes and those of the second to cause dynamic scattering takes the form of a bipolar pulse.

13. A method as claimed in claim 11 wherein the step of selectively restoring individual elemental volumes to a non-scattering state is interrupted one or more times by the insertion of a refresh pulse of shorter duration than said pulse used to cause dynamic scattering which refresh pulse is long enough to restore the unselected elemental volumes to substantially the same scattering state they possessed prior to commencement of the selective restoration step, but is not so long as to restore the selected elemental volumes.

14. A method as claimed in claim 1 wherein the smectic material is a smectic A material.

* * * * *